United States Patent [19]
Lee et al.

[11] Patent Number: 5,732,245
[45] Date of Patent: Mar. 24, 1998

[54] MULTI-MEMORY ACCESS LIMITING CIRCUIT FOR A MULTI-MEMORY DEVICE

[75] Inventors: Young W. Lee, Orange; Sungwon Moh, Wilton; Arno Muller, Westport, all of Conn.

[73] Assignee: Pitney Bowes Inc., Stamford, Conn.

[21] Appl. No.: 631,439

[22] Filed: Apr. 12, 1996

Related U.S. Application Data

[63] Continuation of Ser. No. 163,771, Dec. 9, 1993, abandoned.
[51] Int. Cl.$^6$ ............................................. G06F 12/16
[52] U.S. Cl. .................................. 395/490; 395/186
[58] Field of Search ............................. 395/186, 490, 395/495, 476, 477, 478, 479, 485, 488; 371/40.1; 380/4; 902/26

[56] References Cited

U.S. PATENT DOCUMENTS

| | | | |
|---|---|---|---|
| 4,424,573 | 1/1984 | Eckert, Jr. et al. | 364/464.02 |
| 4,649,475 | 3/1987 | Scheuneman | 395/476 |
| 4,701,856 | 10/1987 | DiGiulio et al. | 364/466 |
| 4,710,882 | 12/1987 | DiGiulio et al. | 364/464.02 |
| 4,747,057 | 5/1988 | DiGiulio et al. | 364/464 |
| 4,817,004 | 3/1989 | Kroll et al. | 364/464.02 |
| 4,998,203 | 3/1991 | DiGiulio et al. | 364/464.02 |
| 5,179,540 | 1/1993 | Stockton | 365/225.7 |
| 5,276,844 | 1/1994 | Aebi et al. | 395/479 |
| 5,303,181 | 4/1994 | Stockton | 365/96 |

FOREIGN PATENT DOCUMENTS

| | | | |
|---|---|---|---|
| 0223130A2 | 5/1987 | European Pat. Off. | G07B 17/02 |
| 0527010A2 | 2/1993 | European Pat. Off. | G07B 17/02 |

*Primary Examiner*—Eddie P. Chan
*Assistant Examiner*—Hiep T. Nguyen
*Attorney, Agent, or Firm*—Angelo N. Chaclas; Charles G. Parks, Jr.; Melvin J. Scolnick

[57] ABSTRACT

The memory access limiting circuit detects when two or more of memory units associated with a microprocessor control system have been accessed enabled concurrently representing an error condition. The memory access limiting circuit is part of an integrated circuit. The integrated circuit also includes an address decoding for receiving the unique address signal and causing a write enable signal to be generated for the memory units and one of a plurality chip select signals to be generated for a respective one of the memory units. The monitoring circuit monitors the pin levels of the integrated circuit assigned for enabling the respective memory unit. The monitoring circuit generates a first output signal when a respective one of the memory unit chip select signals has been enabled and a second output signal when a plurality of chip select signals have been enabled. The second output signal is directed to the microprocessor for corrective action.

2 Claims, 6 Drawing Sheets

MULTI-MEMORY ACCESS LIMITING CIRCUIT FOR A MULTI-MEMORY DEVICE

This application is a continuation of application Ser. Code/No. 08/163,771, filed Dec. 9, 1993, now abandoned.

RELATED APPLICATIONS

U.S. patent application Ser. No. 08/163,627, entitled MULTIPLE PULSE WIDTH MODULATION CIRCUIT, now abandoned; U.S. Pat. No. 5,475,621 issued on Dec. 12, 1995, entitled DUAL MODE TIMER-COUNTER; U.S. Pat. No. 5,471,608 issued on Nov. 28, 1995, entitled DYNAMICALLY PROGRAMMABLE TIMER-COUNTER; U.S. Pat. No. 5,377,264 issued on Dec. 27, 1994, entitled MEMORY ACCESS PROTECTION CIRCUIT WITH ENCRYPTION KEY; U.S. patent application Ser. No. 08/648,454 which is a continuation of U.S. patent application Ser. No. 08/163,811, entitled DUAL MODE TIMER-COUNTER, now abandoned; U.S. Pat. No. 5,530,840 issued on Jun. 25, 1996, entitled ADDRESS DECODER WITH MEMORY ALLOCATION FOR A MICROCONTROLLER SYSTEM; U.S. patent application Ser. No. 08/163,810, entitled INTERRUPT CONTROLLER FOR AN INTEGRATED CIRCUIT; U.S. patent application Ser. No. 08/163,812, entitled ADDRESS DECODER WITH MEMORY WAIT STATE CIRCUIT; U.S. patent application Ser. No. 08/163,813, entitled ADDRESS DECODER WITH MEMORY ALLOCATION AND ILLEGAL ADDRESS DETECTION FOR A MICROCONTROLLER SYSTEM, now abandoned; U.S. Pat. No. 5,483,458 issued on Jan. 9, 1996, entitled PROGRAMMABLE CLOCK MODULE FOR POSTAGE METERING CONTROL SYSTEM; and U.S. Pat. No. 5,552,991 issued on Sep. 3, 1996, entitled CONTROL SYSTEM FOR AN ELECTRONIC POSTAGE METER HAVING A PROGRAMMABLE APPLICATION SPECIFIC INTEGRATED CIRCUIT, unless otherwise noted, all of which patent applications are now pending.

BACKGROUND OF THE INVENTION

The present invention relates to a control system having a two or more memory units and a circuit for enabling access to the memory units for writing information into selected ones of the memory units under particular circumstances.

A conventional postage metering system includes an accounting system for recording the amount of funds and other transaction information dispensed during the metering process. These records are electronically maintained in the non-volatile memory units which are part of the accounting system. The accounting system is conventionally comprised of a programmable microprocessor in bus communication with an integrated circuit and memory units. The integrated circuit includes an address decoder which when properly addressed by the microprocessor enables selecting one of the memories for writing.

It has been observed that under certain anomalous conditions, an ambient error can occur within the accounting system which causes the integrated circuit to write enable more than one of the memories at a time. The condition can corrupt the accounting information recorded to the non-volatile memories.

SUMMARY OF THE INVENTION

It is an objective of the present invention to provide a monitoring circuit for detecting when more than one memory unit has been write enabled.

It is a further objective of the present invention to enable the monitoring circuit to generate an interrupt signal and prevent the generation of a write enable signal to any of the respective memory units.

A microprocessor control system is provided which as one of its function is to maintain the accounting record of a postage metering system. The control system includes a programmable microprocessor, read-only memory or program memory (ROM), random access memory (RAM) and one or more non-volatile memories (NVM). The transaction records are maintained in the NVMs. An application specific integrated circuit (ASIC) is also provided. The ASIC, in response to proper instructions from the microprocessor as one of its responsibilities, read enables or write enables the NVMs.

The ASIC includes specific control pins which are electrically communicated to the respective enabling pins of the respective NVMs. Internal to the ASIC is a monitoring circuit which detects when the appropriate combination of control pins have been activated by the ASIC in response to a valid instruction from the microprocessor for enabling one of the memory units. If the monitoring circuit detects that the pin combination enabled by the ASIC is directed to enable two or more of the memory unit simultaneously, then the monitoring circuit generates an interrupt. The interrupt is received by the microprocessor pursuant to which the microprocessor's programming can take corrective action.

DETAILED DESCRIPTION OF THE PREFERRED EMBODIMENT

Figure 1:
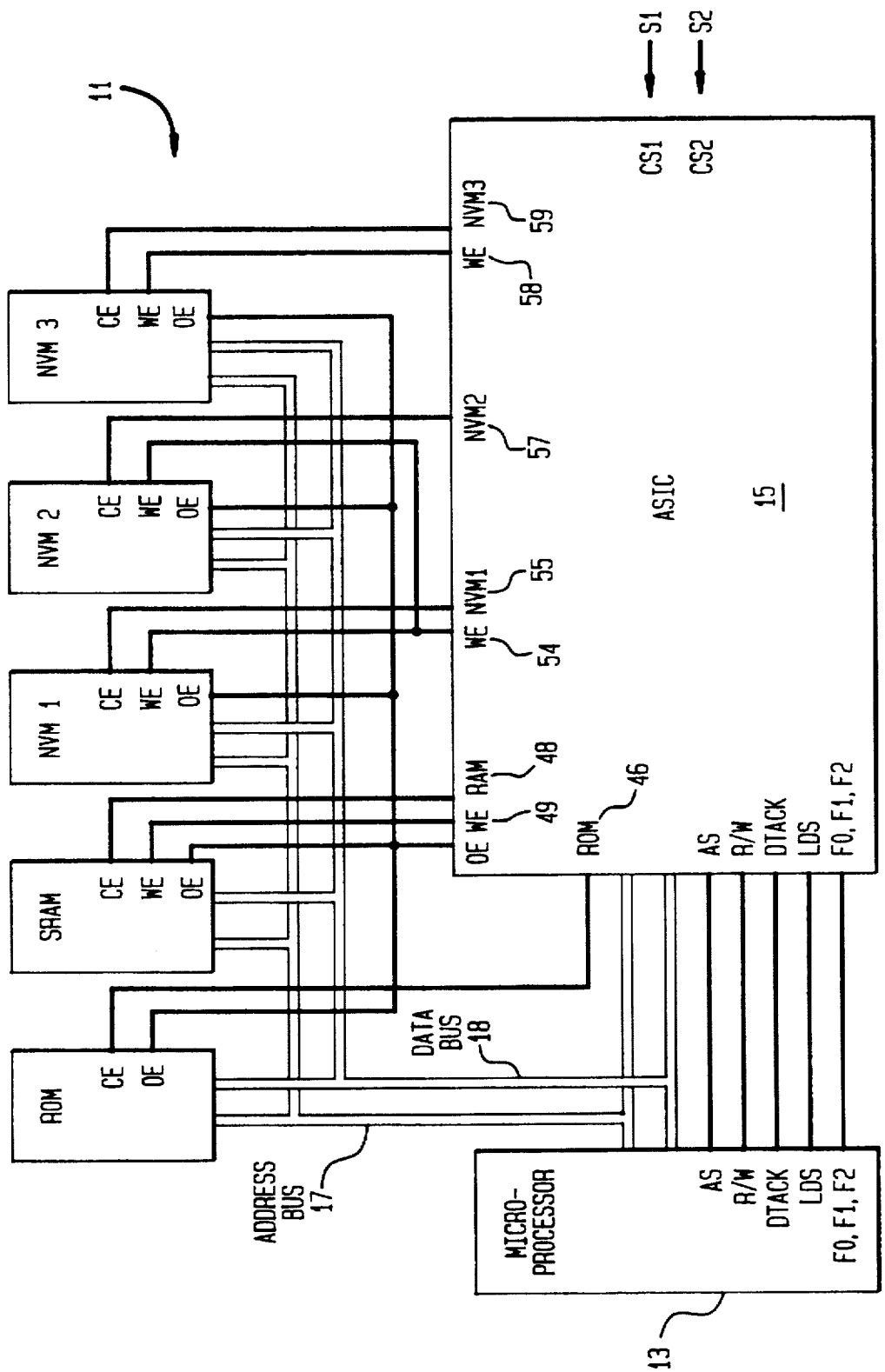
FIG. 1 is a schematic of a microcontroller system in accordance with the present invention.

Referring to FIG. 1, a microcontroller system, generally indicated as 11, is comprised of a microprocessor 13 in bus 17 and 18 communication with an application specific integrated circuit (ASIC) 15, a read only memory (ROM), a random access memory (RAM) and a plurality of non-volatile memories (NVM1, NVM2, NVM3). The microprocessor 13 also communicates with the ASIC 15 and memory units by way of a plurality of control lines, more particularly described subsequently. It should be appreciated that, in the preferred embodiment, the ASIC 15 includes a number of circuit modules or units to perform a variety of control functions related to the operation of the host device, which, in the present preferred embodiment, the host device is a postage meter mailing machine. However, for the purpose of the present invention only the processor interface 19, address decoder 20 and memory security unit 400 will be here particularly described.

Figure 2:
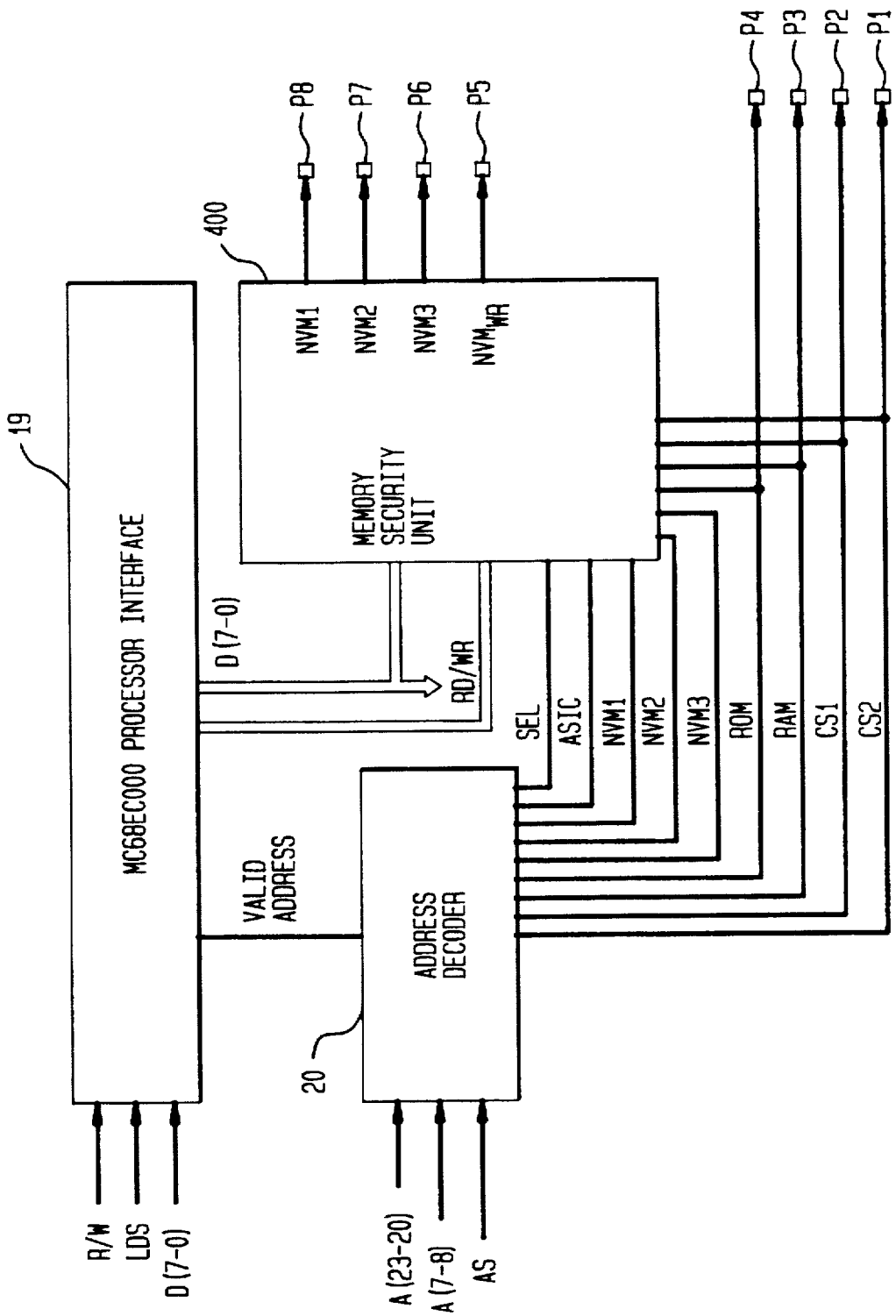
FIG. 2 is a partial schematic of the ASIC address decoder unit and ASIC NVM security unit in accordance with the present invention.

Referring to FIG. 2, the microprocessor 13 communicates the read/write (R/W) control signal, low data strobe (LDS) signal, address strobe (AS) signal, data bus lines D(7-0) and address lines A(7-0, 23-20) to the input side of the ASIC 15.

The R/W, LDS and data signals (D7-0) are received by a microprocessor interface circuit 19. The microprocessor interface circuit 19 performs a number of interface functions with the microprocessor. Those functions relevant to the present invention will be described subsequently. The address lines and the AS signal from the microprocessor 13 are received by the address decoder circuit 20 of the ASIC 15.

The address decoder circuit 20 outputs the number of memory access control signals directed to the memory security unit 400. Particularly, the address decoder 20 directs the ROM and RAM chip select signals to the ASIC pins P3 and P4. The address decoder 20 also directs chip select signals CS1 and CS2 to ASIC pins P2 and P1. In the preferred embodiment of the present invention, the chip select signals CS1 and CS2 are provided in order to control memory access to external memory devices (not shown). Each of the chip select signals, RAM, ROM, CS1 and CS2 are also directed to the input side of a NVM security controller circuit 400 of the ASIC 15. Further directed to the input side of the NVM security controller circuit are the select signal (SEL), read signal (RD), write (WR), ASIC internal memory access select signal (ASIC), NVM1 select, NVM2 select and NVM3 select signals from the address decoder 20.

Figure 3:
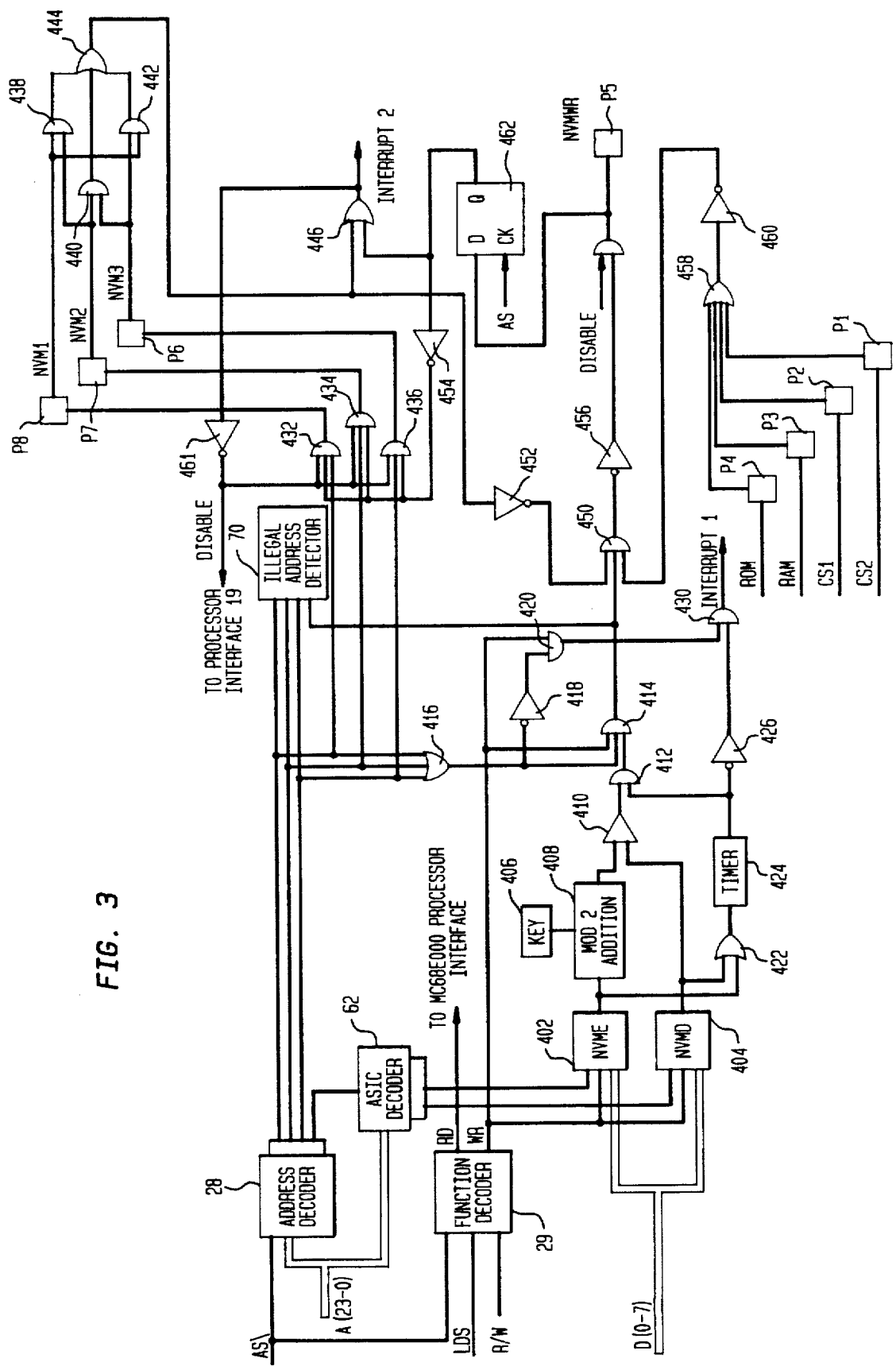
FIG. 3 is a logic schematic of the ASIC memory access and memory monitoring circuits in accordance with the present invention.

Referring to FIG. 3, the address decoder circuit includes an address decoder 28, ASIC decoder 62 and function decoder 29 which decoders will be here functionally described only to the extent relevant to the present invention. The address decoder 28 receives an AS strobe signal and address lines A(0-23) from the microprocessor. The function decoder 29 receives the AS strobe signal, LDS strobe and R/W enable signal, in addition to the output from the address decoder 28. The NVM security circuit 400 includes an illegal address detector circuit 70, more particularly described in U.S. patent application Ser. No. 163,813, now abandoned, commonly as signed and here incorporated by reference.

A NVME register 402 and NVMD register 404 are also provided which receive input from data lines D(7-0), the function decoder 29 and ASIC decoder 62. The output from the NVME 402 is directed to a decryption circuit which needs a secret key from key register 406 and decrypts in the MOD 2 addition circuit 408. The decrypted output from the MOD 2 is compared by the comparator 410 with the encrypted data written to the NVMD register 404. Briefly here described, the data placed on D(7-0) is encrypted by the programmable microprocessor to have a specific relation to the decryption of that data by the Mod 2 Addition circuit. If that relationship is detected by the comparator 410, the output of the comparator 410 go active and is gated through gates 412, 414 and 450 to activate the NVMWR pin P5 of the ASIC under the proper condition subsequently described. The presence of the address strobe signal AS which initiated the sequence of events previously described at flip-flop 462 holds the flip-flop 462 output inactive in the presence of a valid NVMWR signal. If the NVMWR is externally activated without the presence of an address strobe AS signal the flip-flop 462 is caused to change state whenever AS is next enabled causing OR gate 446 to go active. If the OR gate goes active, the state of gate 461 goes inactive disabling gates 432, 434 and 436, thereby disabling authorized memory access to the NVMs. The output of the OR gate 446 is also directed to the processor interface unit 19 which communicates to the microprocessor the interrupt condition.

Referring, more particularly, to FIGS. 4A, 4B, 4C and 4D, during an normal write cycle, the write cycle is initiated at 450 by the microprocessor 13 writing to ASIC registers to unlock the memory. The microprocessor 13 addresses decoder 28.

The address decoder 28 also addresses the ASIC decoder 62 at 458. The ASIC decoder 28 then addresses the NVME register 402 and the NVMD register 404 to receive data from the data lines 0-7 at 460. The function decoder 24 write-enables the NVME register 402 and NVMD register 404 to receive the data at 462. At this point the software encrypted information on data line (0-7) is written to NVME register 402 and NVMD 404 register at 464. The timer 424 is then initiated after the write to either NVME 404 or NVMD 404 and the OR gate 422 is activated. At 466 the encrypted data from the NVMF register 402 is read and combined with the KEY, from the KEY register 406 and decrypt by the MOD 2 408 utilizing the KEY. At 468 the encrypted data is read from NVMD register 404 and compares with decrypted data from MOD 2 408 by 8 bit comparator 410. If the comparison is equal to a defined relationship at 470, then the output from comparator 410 is set active at 472. If the comparison is not equal to a defined relationship at 470 then nothing occurs at 474. The inactive state occurs when spurious data is generated and written to the registers 402 and 404.

If a valid comparison is made at 470, the comparator 410 is activated at 472 and, at 476, the output of the comparator 410 is ANDed with the output of timer 424 and AND gate 412. At 478, an AND gate 414 ANDs the output from gate 412, WR signal from decoder 29 with the output from OR gate 416.

Subsequently, following activation of comparator 410, the microprocessor 13 writes to one of the NVMs by addressing NVM1, NVM2 or NVM3 at 452. At 454 the address decoder 28 produces the appropriate NVM# signal (NVM1, NVM2 or NVM3) corresponding to the addressed NVM. Also the decoder 28 output address causes OR gate 416 to go active at 456. Also indicated at 456, the microprocessor 13 causes the decoder 29 to produce a WR signal. OR gate 416 turns "ON" gate 418 at 480 (refer to FIG. 4B). If, at 482, the timer is active then gate 426 is turned "OFF" and as a result AND gate 430 is held "OFF" at 484. If, at 486, the timer is inactive, then gate 426 is turned "ON" at 488 causing AND gate 430 to turn "ON" and a "INTERRUPT TYPE 1" signal to be issued.

Figure 4A:
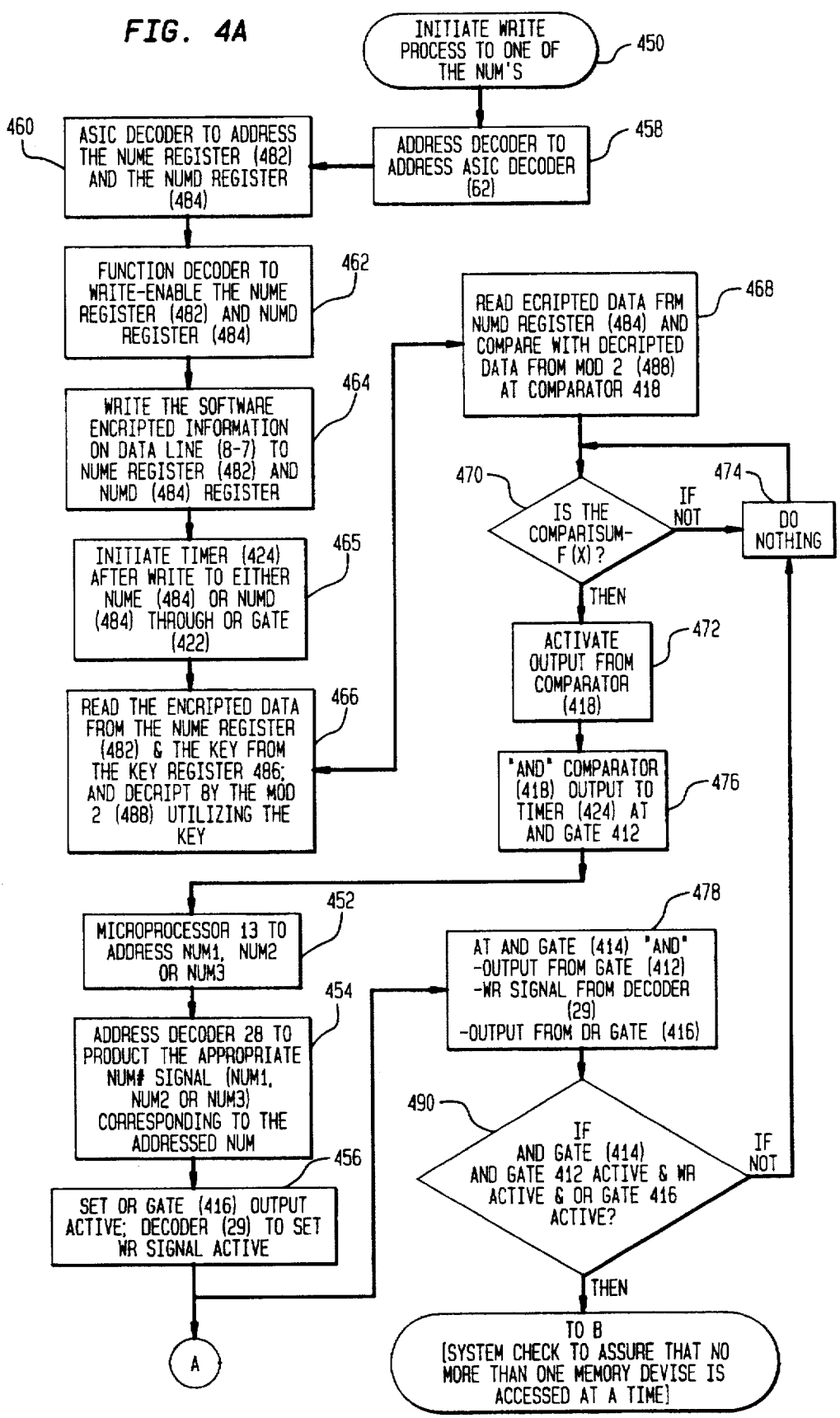
FIGS. 4A, 4B and 4C are logic diagrams of the ASIC memory circuit in accordance with the present invention.
Figure 4B:
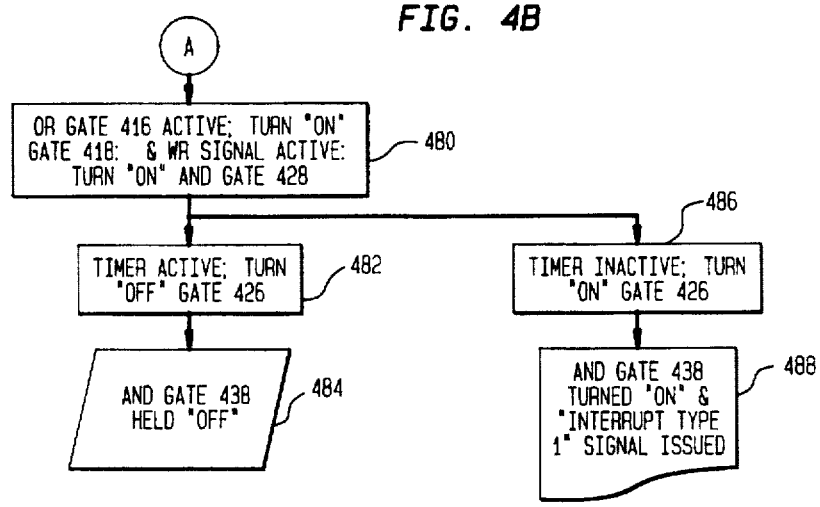

Referring to FIG. 4A, at 478, an AND gate 414 ands the output from gate 412, WR signal from decoder 29 with the output from OR gate 416. If, at 490, AND gate 414 and gate 412 are active and WR active and OR gate 416 active, then the system proceeds to check to assure that no more than one memory device is accessed at a time at 500. If not, then the system returns to location 474.

Figure 4C:
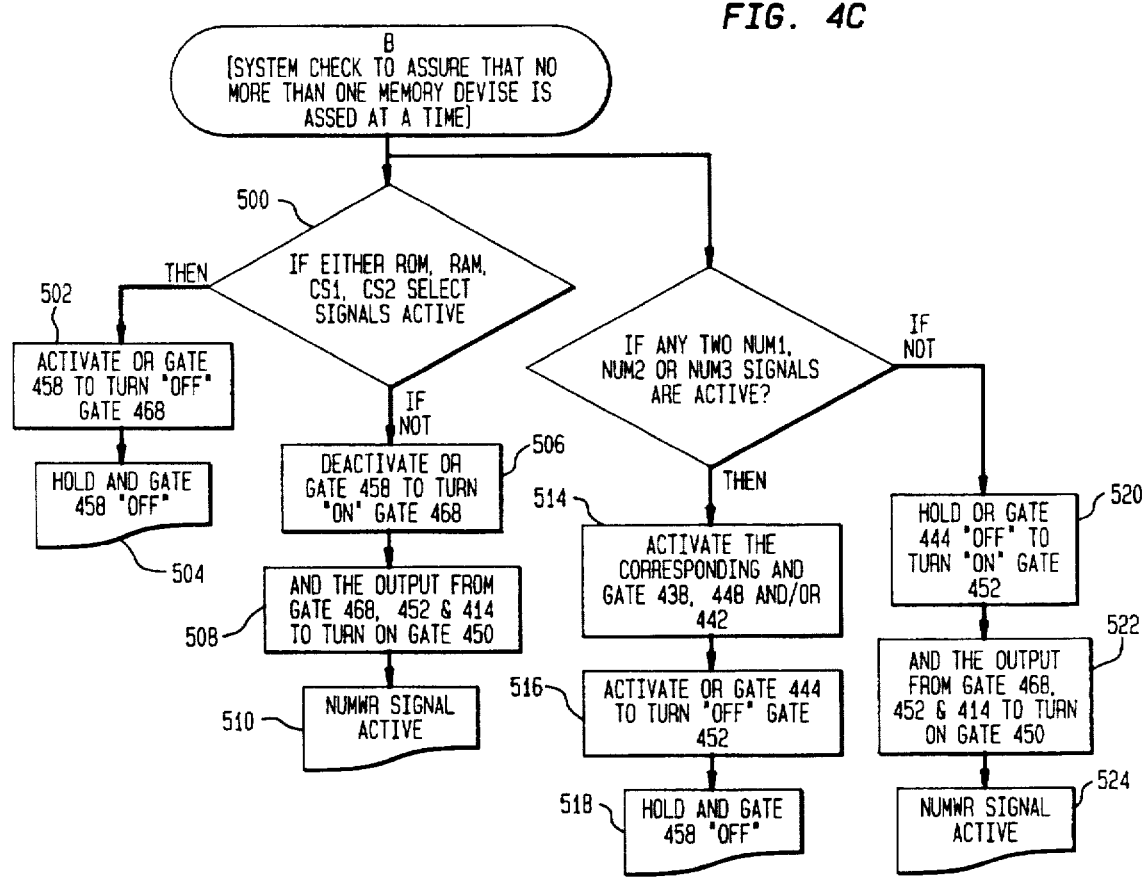

Referring to FIG. 4C, if, at 500, either ROM, RAM, CS1, CS2 select signals are active then OR gate 458 is activated to turn "OFF" gate 460 at 502 and hold AND gate 450 "OFF" at 504. This action prevents a non-volatile memory write enable signal from being issued. If, at 500, either the ROM, RAM, CS1, CS2 select signals are inactive, then OR gate 458 is activated to turn "ON" gate 460 at 506. At 508, the output from gate 460, 452 and 414 are ANDed to turn "ON" gate 456 resulting in the NVMWR signal going active at 510.

If, at 512, any two NVM1, NVM2 or NVM3 signals are active then the corresponding AND gate 438, 440 and/or 442 is set active at 514. OR gate 444 is then set active to turn "OFF" gate 452 at 516 which results in AND gate 450 being held "OFF" at 518. If, at 512, any two NVM1, NVM2 or NVM3 signals are not active then OR gate 444 is held "OFF" result in gate 452 being turned "ON" at 520. The output from gate 460, 452 and 414 are ANDed resulting in gate 456 being turned "ON" at 522. As a result, the NVMWR signal is set active at 524.

Figure 4D:
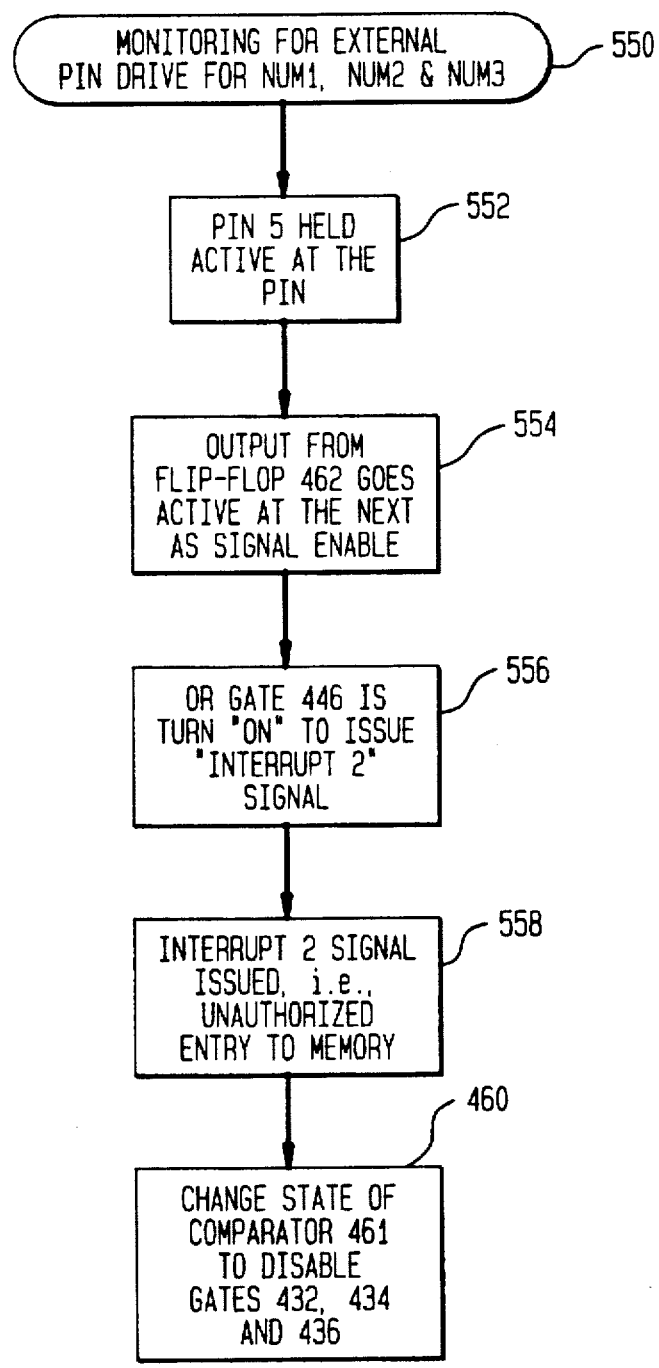
FIG. 4D is a logic diagram of the ASIC monitoring circuit in accordance with the present invention.

Referring to FIG. 4D, the system also monitors, at 550, the appropriate ASIC pins to assure that the pins for NVM1, NVM2 and NVM3 detect whether the pins are externally driven to gain unauthorized access to the memories. In order to gain access, both the NVMWR pin and one of the NVM pins P6, P7 or P8 must be held active. At 552, when pin 5 is illegally held active, the output from flip-flop 462 goes active at the next enabling of the AS signal at 554. As a result, OR gate 446 is turned "ON" to issue "Interrupt 2" signal at 556. At 558, the "Interrupt 2" signal issued is interrupted and recorded an unauthorized entry to memory. Now at 460, the change of state of comparator 461 disables AND gates 432, 434 and 436. The comparator 461 is a one-shot device, thereby permanently disabling the meter NVM memory access.

What is claimed is:

1. An improved integrated circuit for an electronic postage meter, the electronic postage meter further includes a processor and a plurality of non-volatile memory (NVM) units in operative communication with the integrated circuit, the NVM units arranged for storing critical accounting information generated by the processor, the improved integrated circuit comprising:

means for generating a select NVM unit enable signal from a plurality of NVM unit enable signals in response to a unique address generated by the processor, the plurality of NVM unit enable signals activate a write enable pin for each of the plurality of NVM units, respectively;

means for monitoring the write enable pin for each of the plurality of NVM units to determine if the respective write enable pins are active; and means for generating an interrupt signal which prevents the processor from writing to the plurality of NVM units if the monitoring means detects that two or more write enable pins are simultaneously active so that accounting information stored in the plurality of NVM units is not corrupted.

2. The improved integrated circuit of claim 1, further comprising:

means for signaling the processor to regenerate the unique address if the monitoring means detects that two or more write enable pins are simultaneously active.

* * * * *